United States Patent Office 2,999,878
SYNTHESIS OF β-HYDROXY-α-AMINO ACID
Kenji Okawa, Yao City, Osaka, and Mikio Sato, Sumi-
yoshi-ku, Osaka, Japan, assignors to Ajinomoto Co.,
Inc., Tokyo, Japan, a company of Japan
No Drawing. Filed June 5, 1957, Ser. No. 663,608
Claims priority, application Japan June 19, 1956
5 Claims. (Cl. 260—519)

This invention relates to the synthesis of β-hydroxy-α-amino acid and more particularly, to promoting the activity of the methylene group of glycine by forming a cupric complex compound (hereinafter represented as Formula I). Aliphatic or aromatic aldehydes condense with methylene groups in the presence of an adequate basic catalyst, giving rise to β-hydroxy-α-amino acids as follows:

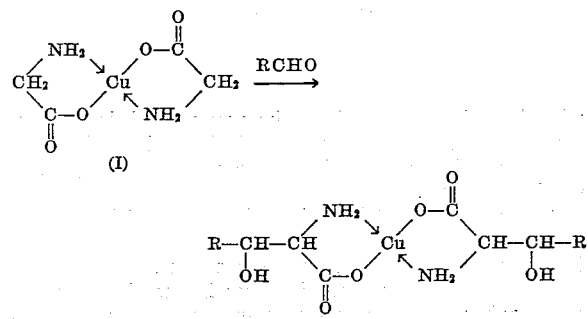

wherein R represents an alkyl or aryl radical.

The mechanism of the reaction of a methylene group of glycine may be explained as follows. The hydrogen atom at the α-position of glycine may be emitted as a proton due to the effect of the carboxyl group according to electronic theory.

This tendency can be enhanced as the result of increased electrical contraction caused by the formation of a complex compound.

The copper complex compound of β-hydroxy-α-amino acid formed as the result of the reaction may change the coordination state and be stabilized this causing movement of reaction equilibrium to the system of the reaction product as shown in the following:

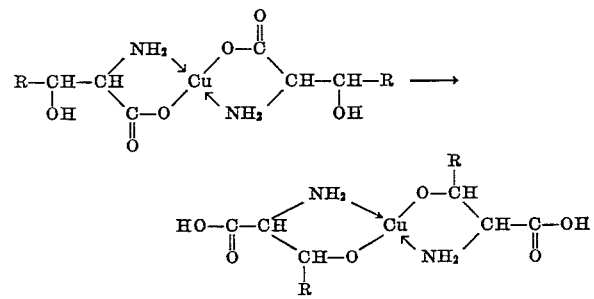

Among the various synthesis processes for β-hydroxy-α-amino acid, the process starting with acylaminomalonic acid ester is most widely used. However, this process is unsuitable for mass production because the starting material is expensive. It has been reported that phenyl-serine is synthesized by reacting benzaldehyde with glycine (Vogler, Helv. Chim. Acta, 33, 211 (1950)). But this process has no general applicability and does not achieve good results when aliphatic aldehydes are used and, moreover, the yield is low.

The process of this invention, however, employs glycine as the starting material, glycine being very economical and producing the desired amino acid at a production rate of over 90%. The invention contemplates treating a heavy metal salt of glycine with aliphatic or aromatic aldehyde at 50–70° C. in a weak alkaline aqueous solution to form corresponding metal complex salts of β-hydroxy-α-amino acid and then removing the metal by the use of hydrogen sulfide. The invention thus provides a very simple and excellent process for large scale production.

A few examples of the application of this invention will be described hereunder. It is to be understood that these examples are simply for the purpose of illustration, and that this invention is not limited thereby.

Example 1

In a small quantity (200 ml.) of water is soaked 300 g. (4 mols) of glycine, and there is added thereto 240 g. of basic copper carbonate ($CuCO_3 \cdot Cu(OH)_2 \cdot H_2O$) thoroughly washed with water, and then the mixture is heated. Carbon dioxide is discharged and glycine copper salt is produced quantitatively.

115 g. of glycine copper salt and 29 g. of potassium carbonate are dissolved in 230 ml. of distilled water and, after 20 ml. of pyridine are added, the mixture is cooled. To the cooled mixture is added 116 ml. of acetaldehyde newly distilled and the mixture is kept at 60° C. with reflux cooling. Then the solution is neutralized and made acidic with a solution prepared by adding 140 ml. of water to 77 ml. of concentrated hydrochloric acid (sp. gr. 1.19). To this acidic solution, hydrogen sulfide is added to precipitate copper as copper sulfide, and then Celite is added. The mixture is filtered by passing the same through a filtering medium filled up with Celite and the residue is washed with water. Through the filtrate and the water used for washing is passed hydrogen sulfide to precipitate the copper and filtering is effected as before. This operation is repeated until the filtrate and water used for washing produce no further precipitation when hydrogen sulfide is passed through to complete the removal of copper. To the final filtrate and the washing water is added 80 ml. of concentrated hydrochloric acid and then 30 g. of wet ion exchange resin (Dowex 50 (H type)), and the mixture is left standing except for occasional shaking. After two hours, the resin is filtered and washed with water. The filtered and washed liquor in an amount of over one litre in combination is fed under reduced pressure through a reflux cooler in which is circulated warm water (60° C.) to remove the aldehyde and water content. If necessary, the solution is again brought to a volume of 300–400 ml., and, after decoloring at 60° C. with active carbon, it is concentrated under reduced pressure, vaporized and dried, and then digested with 99% ethanol.

Potassium chloride separated by the digestion with ethanol is removed, and to the alcoholic filtrate 90 ml. of aniline are added in small portions while the filtrate is being agitated. Then the resulting substance is kept for several days in cold storage. When the precipitated crystals are filtered, washed with alcohol and dried, 83 g. of crystals are obtained. The motor liquor is concentrated under reduced pressure, dried to consolidate and then digested with alcohol to produce snow white crystals, and the crystals are filtered and dried after washing with alcohol, whereby 26 g. of dry crystals are obtained.

The first crystals (83 g.) are dissolved by adding 40 ml. of warm distilled water and are decolored at 60° C. with active carbon. After filtering this solution, 500 ml. of methanol is added to the filtrate and kept cool for 5 days, and the separated crystals are washed and dried. 65 g. of threonine crystals are obtained. The second crystals (26 g.) are dissolved by adding 12 ml. of water and by warming, and, after 150 ml. of methanol are added the solution is kept cool for five days. By filtering and drying the deposited crystals, 18 g. of threonine are obtained. Further, from the mother liquor of the recrystallization of the 65 g. of crystals, 2 g. of threonine crystals are obtained. Thus the total quantity of crystals obtained reaches 85 g., or 71.4% of the theoretical value.

A portion of the reaction liquor is transformed into di-nitro-phenyl derivative and when the same is subjected to colorimetrical examination it is found that the molecular ratio of threonine to glycine reaches 27:1 and that there is more threo-type than allo-type. By paper chromatography, it is found that a great quantity of threonine and a very little glycine is contained and no other by-products are observed at all.

*Example 2*

A process similar to that described above is applied to the reaction of formaldehyde on glycine copper salt. To 2.3 g. of glycine copper salt and 0.6 g. of potassium carbonate are added 3.5 ml. of 35% formalin and 0.8 ml. of pyridine and the mixture is kept at 70° C. for one hour. The mass is made acidic by adding 25 ml. of dilute hydrochloric acid (ca. 1 N) and is then treated as in the preceding example by the adding of hydrogen sulfide, filtering off of copper sulfide and so forth. The formation of about 40–50% of serine is confirmed by paper chromatography.

*Example 3*

The process described above is applied to benzaldehyde.

To 2.3 g. of glycine copper salt, 0.6 g. of potassium carbonate and 0.8 ml. of pyridine are added 10 ml. of water and 4 g. of benzaldehyde and the mixture is maintained at 70° C. for one hour and a half under reflux condensation, and then is made acidic with 3 ml. of concentrated hydrochloric acid. Copper is removed by hydrogen sulfide and the filtrate is concentrated under reduced pressure. Formation of about 40–50% of phenylserine is confirmed by paper chromatography.

What is claimed is:

1. A process for the synthesis of β-hydroxy-α-amino acid selected from the group consisting of serine, threonine and phenylserine comprising reacting an aldehyde selected from the group consisting of formaldehyde, acetaldehyde and benzaldehyde in an alkaline aqueous medium with copper salt of glycine to produce a chelated condensation product having the general formula

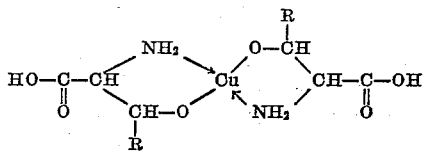

wherein R is a radical from the group consisting of hydrogen, methyl and benzene radicals and precipitating the copper from the condensation product to produce free amino acid.

2. A process for the synthesis of β-hydroxy-α-amino acid selected from the group consisting of serine, threonine and phenylserine comprising preparing an aqueous medium containing copper salt of glycine, an alkali and an aldehyde selected from the group consisting of formaldehyde, acetaldehyde and benzaldehyde, the quantity of alkali being about 0.4 mol and the quantity of aldehyde being about 4 mols per mol of the copper salt of glycine, respectively, heating the aqueous medium to form an intermediate product having the general formula

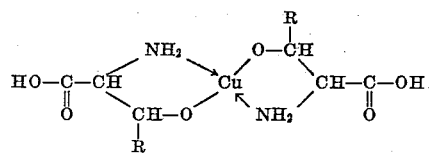

wherein R is a radical from the group consisting of hydrogen, methyl and benzene radicals, and precipitating the copper in and removing the copper from said intermediate product.

3. A process as claimed in claim 2 comprising adding to the intermediate product hydrogen sulphide and an ion exchange resin to remove the copper.

4. A process as claimed in claim 2 wherein the aqueous medium is heated to a temperature of about 50–70° centigrade.

5. A process for the synthesis of free amino acid composed of a mixture of DL-threonine and DL-allothreonine having a preponderance of DL-threonine comprising reacting acetaldehyde in an alkaline aqueous medium with copper salt of glycine and precipitating the copper from the resulting chelated condensation product to produce said free amino acid.

References Cited in the file of this patent

UNITED STATES PATENTS 2,737,526    Ehrhart et al. _____ Mar. 6, 1956